United States Patent [19]

Wuerth et al.

[11] Patent Number: 5,662,388
[45] Date of Patent: Sep. 2, 1997

[54] METHOD AND DEVICE FOR IDENTIFYING A PRESSURE VARIABLE

[75] Inventors: Gebhard Wuerth, Sulzbach-Laufen; Helmut Wiss, Moeglingen; Alfred Strehle, Fellbach, all of Germany

[73] Assignee: Robert Bosch GmbH, Stuttgart, Germany

[21] Appl. No.: 546,863

[22] Filed: Oct. 23, 1995

[30] Foreign Application Priority Data

Nov. 29, 1994 [DE] Germany .................. 44 42 326.8

[51] Int. Cl.[6] .................................... B60T 13/74
[52] U.S. Cl. ....................... 303/3; 303/15; 303/156; 701/71; 701/82

[58] Field of Search ........................ 303/3, 15, 20, 303/155, 156, 157, 158, 159, 166, 167; 364/426.02

[56] References Cited

U.S. PATENT DOCUMENTS

| | | | |
|---|---|---|---|
| 5,136,509 | 8/1992 | Van Zanten et al. | 303/95 |
| 5,348,380 | 9/1994 | Korasiak et al. | |
| 5,454,629 | 10/1995 | Johnson | 364/426.02 |

*Primary Examiner*—Lee W. Young
*Attorney, Agent, or Firm*—Kenyon & Kenyon

[57] ABSTRACT

In a method and device for identifying a pressure variable, in particular in a brake system, the pressure difference is estimated on the basis of a pressure gradient and the actuation duration of a solenoid valve.

6 Claims, 4 Drawing Sheets

METHOD AND DEVICE FOR IDENTIFYING A PRESSURE VARIABLE

BACKGROUND INFORMATION

The present invention relates to a method and device for identifying a pressure difference, in particular in a brake system with antiblocking control and/or traction control.

Typically, pressure differences are detected by means of sensors. Such sensors are very expensive, however.

SUMMARY OF THE INVENTION

The present invention has the object of providing a method and a device with which the pressure difference can be provided in a brake system with antiblocking control and/or traction control, which device is relatively inexpensive and requires only very low outlay.

With the method and device according to the present invention, the pressure difference can be identified, in particular in a brake system with antiblocking control and/or traction control, in a simple and cost effective fashion.

DETAILED DESCRIPTION

It is known that inlet valves and outlet valves which can be activated electrically are provided to modulate the pressure in the individual wheel brakes of a vehicle which is equipped with an antiblocking control and/or traction control. Preferably, two way valves, i.e. hydraulic valves which have only two switching positions (open or closed), are used. The desired pressure build-up gradient or the pressure reduction gradient is achieved by actuating the valves with pulse sequences and varying the pulse length/pulse pause ratio.

The inlet valve which is inserted in the brake line between the brake pressure sensor or the master brake cylinder and the wheel brake is generally switched in its position of rest to permit flow while, in its position of rest, the outlet valve, which serves to reduce pressure, blocks the pressure medium path back to the master brake cylinder via a pump or a pressure equalizing vessel.

Instead of the inlet valve/outlet valve pairs, valve arrangements with three switching positions (pressure build-up, pressure maintenance and pressure reduction) can also be used.

Figure 1:
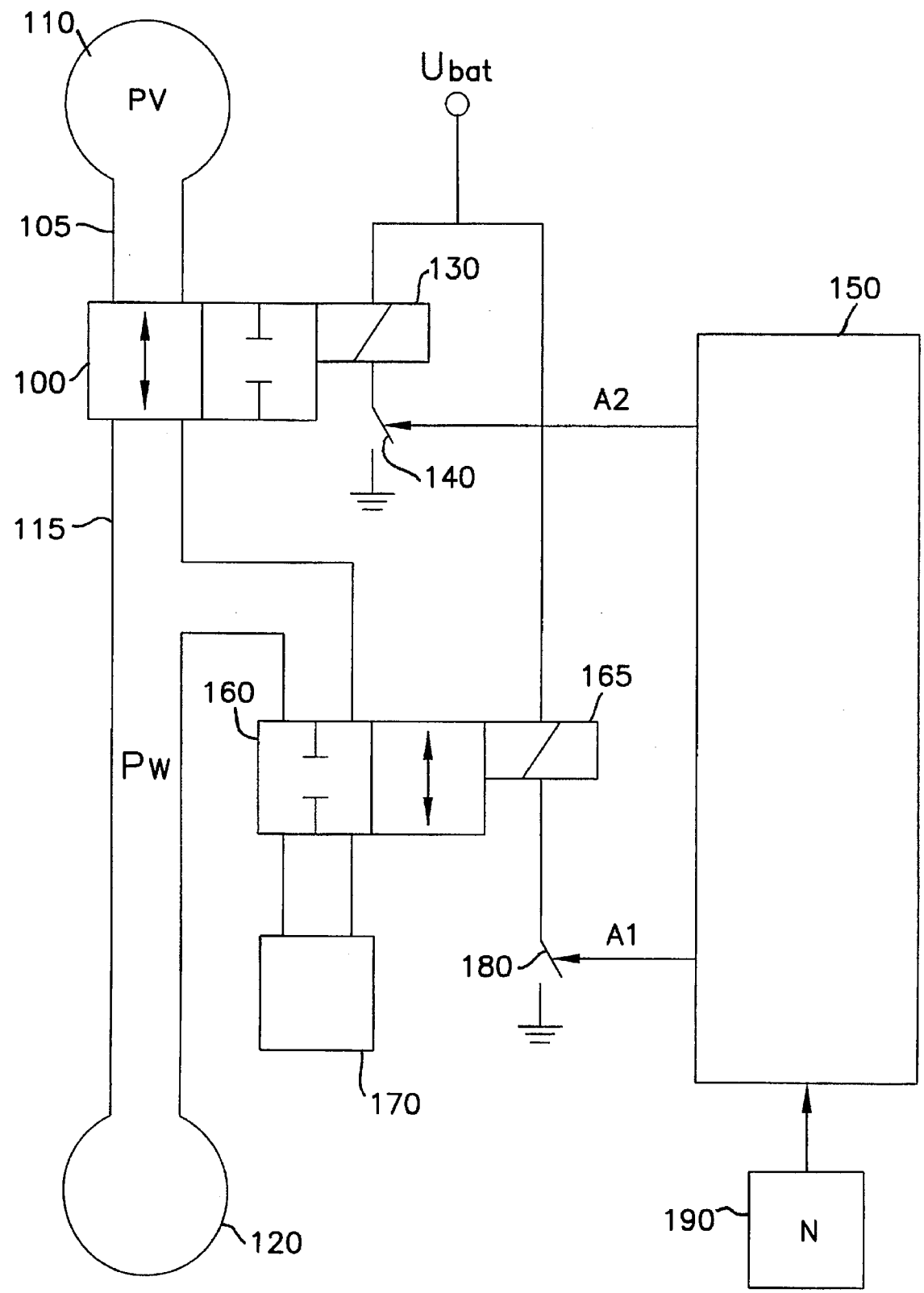
FIG. 1 shows a schematic view of the main elements of the device according to the present invention.

In FIG. 1, the ratios are illustrated by way of the example of an inlet valve and an outlet valve of an antiblocking control and/or traction control. However, the described procedure is not limited solely to the use of inlet valves and outlet valves in brake systems with antiblocking control and/or traction control.

The inlet valve 100 is connected to a master brake cylinder 110 via a first port via a first line 105. Usually a pressure PV vails in the first line. The second port of the solenoid valve 100 is connected to the wheel brake 120 via a second line 115. The pressure PW which determines the braking force of the wheel vails in the second line 115.

There is a connection to a port of an outlet valve 160 from the line 115, the second port of the outlet valve 160 being connected to a return pump 170.

The illustrated inlet valve 100 is a so-called 2/2-way solenoid valve. In the position of rest, the solenoid valve 100 enables the flow between the first line 105 and the second line 115 as long as there is no current flowing. In this position, the solenoid valve armature is held by a spring. By energizing a coil 130 a force is exerted counter to the spring force which moves the valve into its closed position.

The illustrated outlet valve 160 is also a so-called 2/2-way solenoid valve. In the position of rest, the solenoid valve 160 blocks the through-flow between the second line 115 and the return pump 170 as long as no current is flowing. In this position, the solenoid valve armature is held by a spring. By energizing a coil 165 a force is exerted counter to the spring force which moves the valve into its open position.

The coil 165 is connected by a first electrical terminal to a supply voltage $U_{bat}$ and by a second terminal to a first switching means 180. Correspondingly, the coil 130 is connected by a first electrical terminal to the supply voltage $U_{bat}$ and by a second terminal to a second switching means 140.

Preferably, field effect transistors are used as switching means. The control terminal of the first switching means 180 is connected to a control unit 150. The first switching means is supplied with a first actuation signal A1 via this connection. The control terminal of the second switching means 130 is also connected to the control unit 150 and is supplied with a second actuation signal A2 by the control unit 150.

By closing the switching means 140 and 180, the flow of current between the supply voltage through the coil 130 or 165 to the ground terminal is enabled.

The control unit 150 is preferably an antiblocking control and/or traction control. It processes various signals from various sensors and signals from other control units such as for example a travel speed control and/or a travel speed limiter. In particular, this device processes signals from rotational speed sensors 190 which detect the rotational speeds of the various wheels of the motor vehicle. On the basis of the various processed signals, the control unit 150 determines the signals A1 and A2 for the actuation of the coils 130 and 165.

The pressure build-up and the pressure reduction in the second line 150, and thus in the wheel brake cylinder 120 can be controlled by means of the valves 100 and 160.

If the valve 100 is closed, a pressure difference PD is formed between the first line 105 and the second line 115. In order to permit optimum actuation of the solenoid valve 100, the pressure difference PD between the line 105 and the line 115 must be known.

The pressure PV in the master brake cylinder 110 depends essentially on the activation of the brake pedal by the driver. Depending on how strongly the driver activates the brake pedal, the pressure PV assumes different values.

Figure 2A:
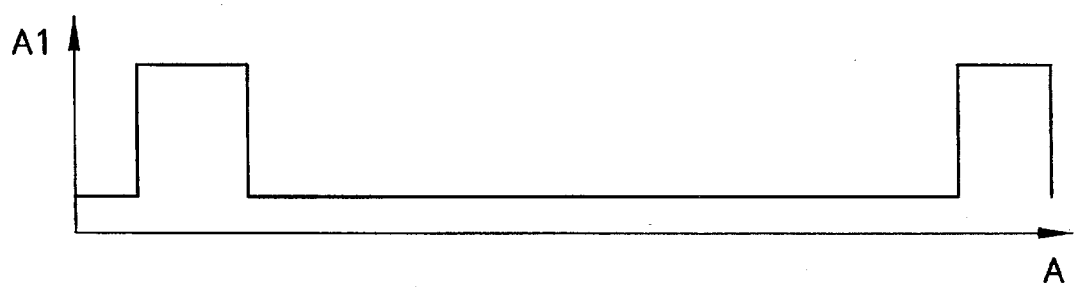
FIG. 2a shows the plot of an actuation signal for one valve.
Figure 2B:
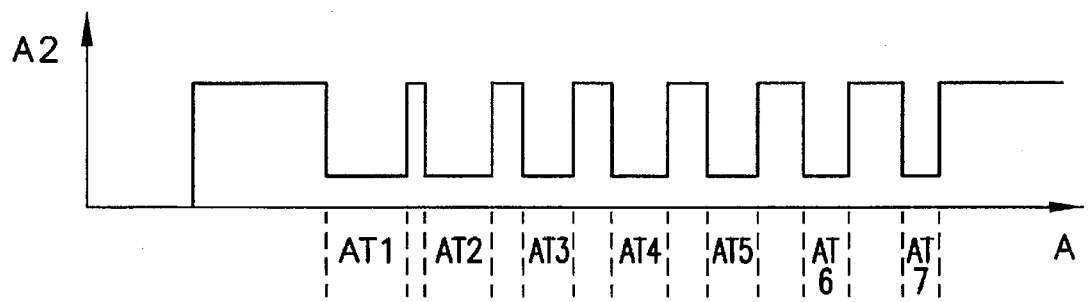
FIG. 2b show the plot of another actuation signal for another valve.
Figure 2C:
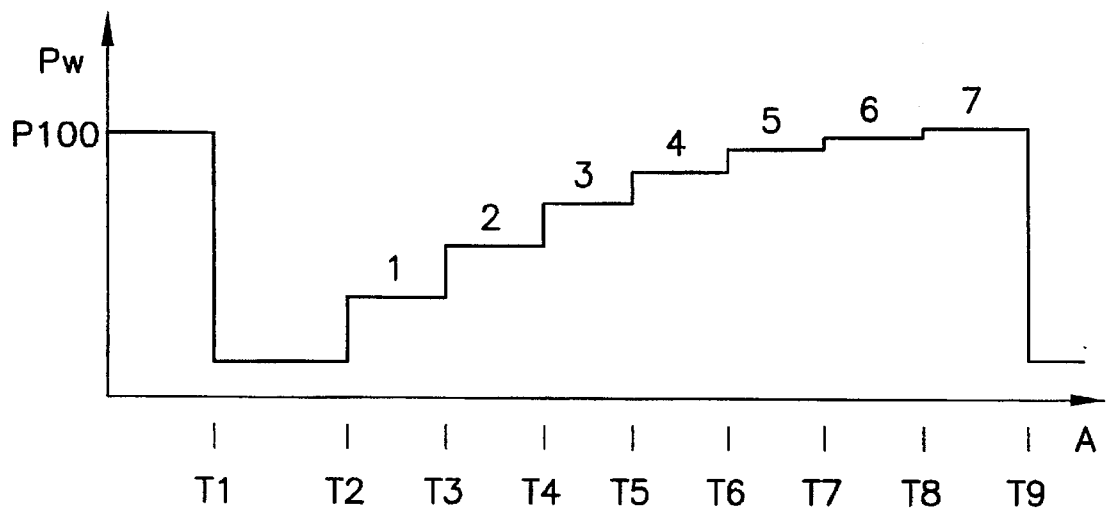
FIG. 2c shows the plot of a wheel brake pressure.

In FIG. 2a, the actuation signal A1 for the valve 160 is plotted and, in FIG. 2b, the actuation signal A2 for the valve 100 and the respective actuation times AT1, AT2, ... AT7 are plotted. In FIG. 2c, the pressure PW in the line 115 which corresponds to the wheel brake pressure is also plotted.

When the brake pedal is activated by the driver, a pressure PV builds up in the master brake cylinder 110. Up to the time T1, the solenoid valve 100 is supplied with an actuation signal A2 which has a lower level. The first actuation signal A1 also has a low level. This means that the coil 165 is also not energized. Both solenoid valves are therefore in their position of rest. This means that the pressure PV which is prescribed by the driver by activating the brake pedal acts on the wheel cylinder 120. The pressure in the line 115 therefore also assumes the value PV.

At the time T1, the control unit 150 detects a tendency of a wheel to block by means of the evaluation of the rotational speed sensors 190. Starting from this time T1, both actuation signals A1 and A2 are set to a high level. This means that the switches 140 and 180 close. Both solenoid valves are energized and go into their working position. This results in the pressure in the first line 105 remaining at the value PV. In contrast, the pressure in the line 115 drops to a smaller value and the braking effect of the wheel decreases.

After the pressure has dropped, the actuation signal A1 is withdrawn, in response to which the solenoid valve 160 interrupts the reduction of pressure and the pressure remains constant.

Subsequently, a build-up pulse sequence follows. By opening the solenoid valve 100, the pressure in the wheel brake cylinder 120 is raised to its original value in a plurality of stages. Usually, a value AZS for the number of stages and a value ATS for the overall length of the actuation are strictly prescribed. In this time, the solenoid valve 160 remains closed.

At the times T2, T3, T4, T5, T6, T7, T8, the control unit 150 withdraws the second actuation signal A2, in each case for a specific time duration ATN. The time duration for which the actuation signal A2 is withdrawn determines the value by which the pressure PW in the second line 115 rises. In the case of a relatively long actuation duration, the pressure rises by a larger value than in the case of a short actuation duration.

Whenever the second actuation signal A2 is withdrawn, the pressure rises by a specific value as a function of the duration of the withdrawal. At the time T8, the pressure has reached its original value again. At the time T9, a tendency of a wheel to block is detected and the control device 150 prescribes a first actuation signal 100 again, which actuation signal 100 results in a reduction of pressure in the second line 115 and thus a withdrawal of the braking force. The time T9 corresponds to the time T1 at which a new control cycle of the antiblocking controller or of the traction controller starts.

In order to prescribe the actuation signal A2 in an optimum way, the pressure difference PD between the pressure PW and the pressure PV in the master brake cylinder 110 must be known. In order to save on pressure sensors, the following procedure is adopted.

With a known pressure gradient, i.e. if the change in the pressure per time unit is known, the change in the pressure PW in the second line 115 can be estimated from the duration of the actuation signal A1 or A2, and the pressure difference PD between the pressure PW in the line 115 and the pressure PV in the master brake cylinder 110 can be identified from the change in the pressure PW.

The new value $PD_{i+1}$ for the pressure difference is obtained according to the following formula:

$$PD_{i+1} = PD_i + AT_i * AUSG \quad (1)$$

Here, $PD_i$ is the old value for the pressure difference and $AT_i$ is the duration of the actuation since the last calculation of the pressure difference. The actuation time corresponds to the duration of the actuation signal A2. The variable AUSG is a pressure gradient in the pressure-build-up direction which can also be designated as the build-up gradient. This pressure gradient indicates the value that the pressure rises within a time unit.

The change in the pressure PW in the second line, and thus the pressure difference, is therefore estimated on the basis of the actuation duration which corresponds to the time in which the valve 100 is opened and the change in the pressure per unit time.

Subsequently, the pressure difference PD which changes as a result of the pressure reduction must be estimated. For this purpose, various possible ways are provided.

In the first possible way, the estimation takes place in a way corresponding to the pressure buildup according to the following formula:

$$PD_{i+1} = PD_i + AT * ABG \quad (2)$$

Here, $PD_i$ is the old value for the pressure difference and AT is the actuation duration of the valve 160. The actuation duration corresponds to the length of the actuation signal A1. The variable ABG is a pressure gradient in the pressure reduction direction, which can also be designated as the reduction gradient. This pressure gradient indicates the value that the pressure drops within a time unit.

In a second possible way, the new pressure difference $PD_{i+1}$ is determined on the basis of the overall duration AT of the actuation times $AT_i$ of the pressure build-up phase and the build-up gradient AUSG according to the following formula.

$$PD_{i+1} = PD_i - AT * AUSG \quad (3)$$

Here, $PD_i$ is the old value for the pressure difference which was sent at the end of the build-up pulse sequence. The value of the pressure difference which was sent before the start of the pressure build-up is obtained as the new pressure difference.

Generally, the new value of the pressure difference is obtained from the old value of the pressure difference, the actuation duration of the solenoid valve and the pressure gradient.

If the first actuation signal A1 occurs too early or too late, a correction must take place. Too early means that the value AZS for the entire actuation duration or the value ATS for the number of actuation pulses has not yet been reached.

In a first variant, the new start value $PD_{i+1}$ for the pressure difference is identified on the basis of the old start value for the pressure difference $PD_i$ according to the following formula:

$$PD_{i+1} = PD_i + K1 * (\frac{P100}{AT} - 1) \quad (4)$$

The value AT is the sum of the duration of the actuation pulses of the build-up pulse sequence of the preceding control cycle. The value K1 is a constant. The value P100 is a controller variable which contains an estimated overall actuation time for the pressure build-up to the tendency of the wheel to block.

In a particularly advantageous embodiment, the start value for the pressure difference is determined according to the following formula:

$$PD_{i+1}=PD_i-K2*\text{SIGN}(AZ-AZS)* |F(AZ-AZS)| \quad (5)$$

The value AZS is the number of actuation pulses for which the valve 100 is usually actuated during a control cycle. The value AZ is the actual number of actuation pulses of the ceding control cycle. The value K2 is a constant. F is any desired function, preferably the difference squared.

The value for the pressure difference PD is corrected on the basis of the comparison between the usual value AZS for the number of pressure build-up pulses and the actual number AZ of the pressure build-up pulses.

Figure 3A:
FIG. 3a shows the plot of a controller variable.
Figure 3B:
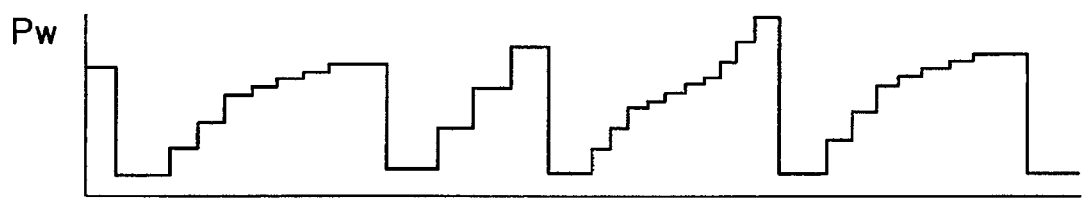
FIG. 3b shows an extended plot of the wheel brake pressure.
Figure 3C:
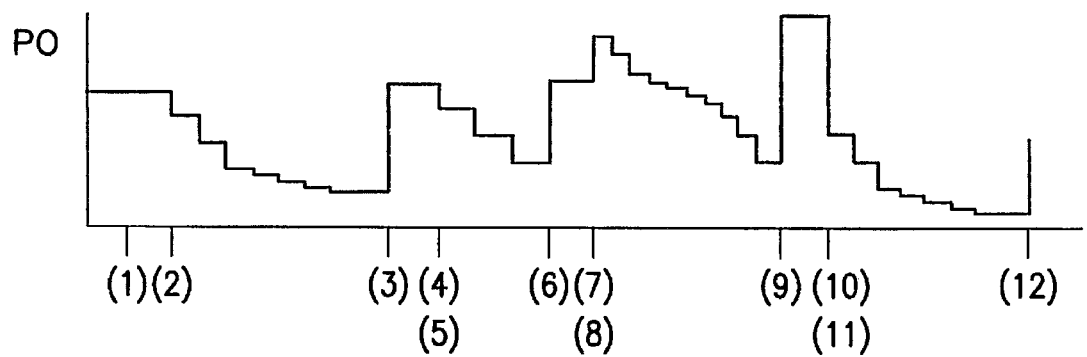
FIG. 3c shows the plot of a pressure difference against time.

In FIG. 3a, the controller variable P100 is plotted, in FIG. 3b the actual pressure PW in the second line 115, and thus in the wheel brake cylinder, is plotted and, in FIG. 3c, the estimated pressure difference PD is plotted against time.

At the start of the control at the time (1), the pressure difference is set to a strictly prescribed initial value. At the times (2), (5), (8) and (11), the build-up pulse sequences start, i.e. actuation takes place as illustrated in FIG. 2b. And the pressure difference is calculated according to the formula (1). This process is aborted as soon as a positive edge of the actuation signal A1 occurs. This takes place at the times (3), (6), (9) and (12).

At these times, the pressure difference is set again to a value which is obtained according to the formulae (2) or (3). Afterwards, the pressure difference is corrected according to the formulae (4) or (5).

Figure 4:
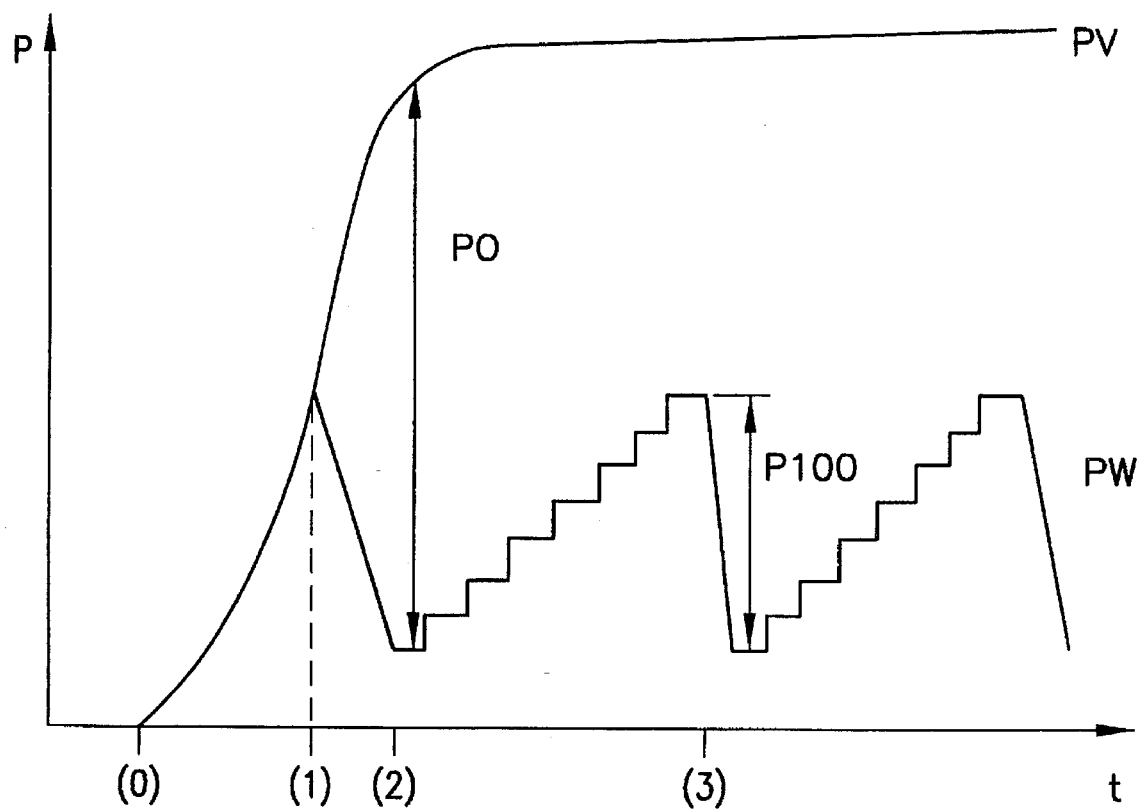
FIG. 4 shows various pressure signals which are plotted against time.

In the exemplary pressure profile which is shown in FIGS. 3a, 3b and 3c no correction takes place at the time (4) since the value P100 has been reached or the usual number of pressure build-up pulses have taken place. At the time (7), the pressure difference PD is corrected to a higher value since the value P100 has not been reached or fewer pressure build-up pulses have occurred than usual. At the time (10), the pressure difference is corrected to a lower value since the value P100 has been exceeded or more pressure build-up pulses have occurred than usual. In FIG. 4, the pressure PV in the master brake cylinder 110 and the pressure PW in the wheel brake are plotted. The times correspond to those designated in FIGS. 3a, 3b and 3c. At the time (0), the driver activates the brake. Starting from this time, pressure builds up in the master brake cylinder. The pressure PV rises. At the time (1), the control device 150 detects a wheel with a tendency to block. The solenoid valve 160 is opened and the solenoid valve 100 is closed by means of a corresponding actuation signal. This results in a pressure reduction starting from the time (1). Starting from the time (2), a build-up pulse sequence, such as is illustrated in FIGS. 2a, 2b and 2c starts. The pressure difference PD corresponds to the difference between the pressure PV and the pressure PW. The controller variable P100 is also shown with an arrow, this variable being a measure of the pressure reduction and the pressure range, respectively, within which the pressure fluctuates during the control cycle starting from the time (1).

What is claimed is:

1. A method for determining a pressure difference between a first pressure in a first line coupled to a first solenoid valve and a second pressure in a second line coupled to the first solenoid valve, the method comprising the steps of:

determining a first duration of an actuation of the first solenoid valve;

determining a previous pressure difference before the actuation of the first solenoid valve;

obtaining a predetermined pressure gradient, the pressure gradient representing a pressure reduction;

determining the pressure difference as a function of the first actuation duration, the previous pressure difference, the predetermined pressure gradient and a second duration of actuation of a second solenoid valve arranged between the second line and a third line;

comparing an expected actuation duration to an actual actuation duration of the first solenoid valve since a last actuation of at least one of the first and second solenoid valves; and correcting the pressure difference as a function of the comparison, after actuation of the second solenoid valve.

2. The method according to claim 1, wherein the first solenoid valve is contained in a brake system.

3. A method for determining a pressure difference between a first pressure in a first line coupled to a first solenoid valve and a second pressure in a second line coupled to the first solenoid valve, the method comprising the steps of:

determining a first duration of an actuation of the first solenoid valve;

determining a previous pressure difference before the actuation of the first solenoid valve;

obtaining a predetermined pressure gradient, the pressure gradient representing a pressure reduction;

determining the pressure difference as a function of the first actuation duration, the previous pressure difference, the predetermined pressure gradient and a second duration of actuation of a second solenoid valve arranged between the second line and a third line;

comparing a usual number of actuation pulses to an actual number of actuation pulses of the first solenoid valve since a last actuation of at least one of the first and second solenoid valves; and correcting the pressure difference as a function of the comparison, after actuation of the second solenoid valve.

4. A device for determining a pressure difference between a first pressure in a first line coupled to a first solenoid valve and a second pressure in a second line coupled to the first solenoid valve, comprising:

means for determining a first duration of an actuation of the first solenoid valve;

means for determining a previous pressure difference before the actuation of the first solenoid valve;

means for obtaining a predetermined pressure gradient, the pressure gradient representing a pressure reduction;

means for determining the pressure difference as a function of the first actuation duration, the previous pressure difference, the predetermined pressure gradient and a second duration of actuation of a second solenoid valve arranged between the second line and a third line;

means for comparing an expected actuation duration to an actual actuation duration of the first solenoid valve since a last actuation of at least one of the first and second solenoid valves; and means for correcting the pressure difference as a function of the comparison, after actuation of the second solenoid valve.

5. The device according to claim 4, wherein the first solenoid valve is contained in a brake system.

6. A device for determining a pressure difference between a first pressure in a first line coupled to a first solenoid valve and a second pressure in a second line coupled to the first solenoid valve, comprising:

means for determining a first duration of an actuation of the first solenoid valve;

means for determining a previous pressure difference before the actuation of the first solenoid valve;

means for obtaining a predetermined pressure gradient, the pressure gradient representing a pressure reduction;

means for determining the pressure difference as a function of the first actuation duration, the previous pressure difference, the predetermined pressure gradient and a second duration of actuation of a second solenoid valve arranged between the second line and a third line;

means for comparing a usual number of actuation pulses to an actual number of actuation pulses of the first solenoid valve since a last actuation of at least one of the first and second solenoid valves; and means for correcting the pressure difference as a function of the comparison, after actuation of the second solenoid valve.

\* \* \* \* \*